(12) United States Patent
Gamez

(10) Patent No.: US 8,413,607 B2
(45) Date of Patent: Apr. 9, 2013

(54) WILDLIFE WATERING TROUGHS AND RELATED STRUCTURES AND METHODS

(76) Inventor: Gilberto Gamez, Round Rock, TX (US)

( * ) Notice: Subject to any disclaimer, the term of this patent is extended or adjusted under 35 U.S.C. 154(b) by 379 days.

(21) Appl. No.: 12/879,625

(22) Filed: Sep. 10, 2010

(65) Prior Publication Data

US 2011/0114027 A1    May 19, 2011

Related U.S. Application Data

(60) Provisional application No. 61/241,757, filed on Sep. 11, 2009.

(51) Int. Cl.
*A01K 7/00* (2006.01)

(52) U.S. Cl.
USPC .............................................. 119/74

(58) Field of Classification Search ............ 119/74, 119/75, 72, 51.5, 255; 239/17, 20, 24, 211
See application file for complete search history.

(56) References Cited

U.S. PATENT DOCUMENTS

| | | | | |
|---|---|---|---|---|
| 372,985 | A | | 11/1887 | Mather .................. 122/428 |
| 1,762,126 | A | * | 6/1930 | Smith .................... 222/113 |
| 2,002,378 | A | | 5/1935 | Richardson ............ 119/69 |
| 3,017,859 | A | | 1/1962 | Stem ...................... 119/57.8 |
| 3,141,442 | A | * | 7/1964 | Harris .................... 119/246 |
| 3,313,273 | A | | 4/1967 | Mitchell ................ 119/72 |
| 3,648,659 | A | | 3/1972 | Jones ..................... 119/69.5 |
| 4,019,462 | A | | 4/1977 | Palfalvy ................ 119/51.5 |
| 4,094,464 | A | * | 6/1978 | Kawamura et al. ..... 239/17 |
| 4,836,142 | A | * | 6/1989 | Duback .................. 119/255 |
| 4,915,060 | A | | 4/1990 | Kling et al. ............ 119/61.4 |
| 4,976,220 | A | | 12/1990 | Gershman .............. 119/475 |
| 4,976,222 | A | | 12/1990 | Cooke .................... 119/60 |
| 4,982,702 | A | | 1/1991 | Copps .................... 119/69.5 |
| 5,000,122 | A | | 3/1991 | Smith ..................... 119/58 |
| 5,002,017 | A | | 3/1991 | Hollyday et al. ...... 119/73 |
| 5,095,653 | A | * | 3/1992 | Guldberg ............... 47/83 |
| 5,125,765 | A | | 6/1992 | Verble ................... 405/31 |
| 5,235,934 | A | | 8/1993 | Runion .................. 119/51.01 |
| 5,288,018 | A | * | 2/1994 | Chikazumi ............ 239/20 |
| 5,406,909 | A | | 4/1995 | Wenstrand ............. 119/74 |
| 5,445,112 | A | * | 8/1995 | Grosman ............... 119/265 |
| 5,456,210 | A | | 10/1995 | Miller .................... 119/75 |
| 5,474,025 | A | | 12/1995 | Lee ........................ 119/464 |
| 5,501,178 | A | * | 3/1996 | Kemp .................... 119/74 |
| 5,524,399 | A | | 6/1996 | Reum et al. ........... 52/169.7 |
| D372,985 | S | | 8/1996 | Bourgault .............. D25/2 |
| 5,694,885 | A | | 12/1997 | Deitrich et al. ....... 119/477 |
| 5,775,260 | A | * | 7/1998 | Jansen ................... 119/246 |

(Continued)

FOREIGN PATENT DOCUMENTS

| | | |
|---|---|---|
| EP | 126541 | 11/1984 |
| EP | 1566099 | 8/2005 |
| JP | 90250121 A | 9/1997 |

OTHER PUBLICATIONS

Bone et al., "Water for West Texas Wildlife," published by Texas Parks and Wildlife Department, 1992.

(Continued)

*Primary Examiner* — Yvonne Abbott

(74) *Attorney, Agent, or Firm* — Fulbright & Jaworski L.L.P.

(57) ABSTRACT

Water troughs and structures for retrofitting a watering trough to provide safe water access for birds and other wildlife.

25 Claims, 9 Drawing Sheets

U.S. PATENT DOCUMENTS

| | | | | |
|---|---|---|---|---|
| 6,073,583 A * | 6/2000 | Cumming | | 119/72 |
| 6,206,298 B1 * | 3/2001 | Ting | | 239/20 |
| 6,209,797 B1 * | 4/2001 | Jenney | | 239/17 |
| D446,313 S | 8/2001 | Sullivan | | D25/2 |
| 6,416,197 B1 * | 7/2002 | Chang | | 362/96 |
| 6,499,249 B1 * | 12/2002 | Luijkx | | 47/41.01 |
| 6,866,005 B1 | 3/2005 | Bunker | | 119/72 |
| 6,945,468 B1 * | 9/2005 | Rodriguez et al. | | 239/17 |
| 7,305,936 B2 | 12/2007 | Tippetts | | 119/52.2 |
| 8,292,195 B2 * | 10/2012 | Freeman | | 239/20 |
| 2002/0092476 A1 | 7/2002 | Vlach et al. | | 119/61.1 |
| 2004/0221817 A1 | 11/2004 | Hatfield | | 119/74 |
| 2006/0032936 A1 * | 2/2006 | Proch et al. | | 239/16 |
| 2006/0162671 A1 | 7/2006 | Neuer | | 119/537 |
| 2007/0039554 A1 | 2/2007 | Colvin | | 119/72 |
| 2007/0137585 A1 | 6/2007 | Rausch et al. | | 119/53 |
| 2007/0163505 A1 | 7/2007 | Lynch | | 119/52.1 |
| 2008/0142612 A1 * | 6/2008 | Potter | | 239/17 |
| 2008/0156271 A1 | 7/2008 | Roes et al. | | 119/72.5 |
| 2009/0078209 A1 | 3/2009 | Kroeker | | 119/52.1 |

OTHER PUBLICATIONS

"Bird Guzzler," accessed at www.bosstanks.com/birdguzzler.htm on Aug. 17, 2009.

"Cement Pond," accessed from media.photobucket.com/image/cement%20pond/janetlong18/IMG_4161.jpg, on Aug. 14, 2009.

"http://image16.webshots.com/17/7/88/47/178278847/UadCNr_fs.jpg," accessed on Aug. 14, 2009.

"http://localfarmsupply.com/stock-tank-watering-73/stock-tanks-74/", accessed on Aug. 13, 2009.

"Oasis Guzzler: Upland Bird & Wildlife Watering System," accessed at www.oasisguzzler.com, 2008.

"www.bosstanks.com/tanks.htm," accessed on Aug. 17, 2009.

International Search Report and Written Opinion issued in PCT/US210/048466, dated Jun. 27, 2011.

* cited by examiner

WILDLIFE WATERING TROUGHS AND RELATED STRUCTURES AND METHODS

CROSS-REFERENCE(S) TO RELATED APPLICATION(S)

This application claims priority to U.S. Provisional Patent Application No. 61/241,757 filed Sep. 11, 2009. This provisional application is expressly incorporated by reference.

BACKGROUND OF THE INVENTION

1. Field of the Invention

The invention relates generally to watering troughs configured for delivery of water to animals, such as birds and other wildlife. The watering troughs are configured to optionally retain soil, sand, and/or gravel in the vicinity of the water, thus providing for a simulated shoreline. Further, the availability of gravel is beneficial because many birds require gravel as a digestive aid to facilitate breakdown of hardy vegetation, seed husks, and insect shells. Further, the watering troughs by virtue of their configuration provide for safe delivery of water to birds with reduced risk of drowning.

The invention also relates to structures for retrofitting an existing watering trough to convert it into a trough suitable for safe delivery of water to birds as well as other wildlife. The invention also relates to methods of delivering water to animals using the watering troughs of the present invention.

The invention further relates to methods of retrofitting a watering trough to deliver water, sand, and/or gravel to birds, or to retrofit a watering trough to make it suitable for safe delivery of water to birds as well as larger animals.

2. Description of Related Art

Examples of structures for providing water or food to animals include those disclosed in U.S. Pat. Nos. 4,915,060, 4,976,222, 5,002,017, 5,235,934, 5,406,909, and 5,456,210, U.S. Patent Application Pub. Nos. 2002/0092476, 2004/0221817, and 2007/0137585, and Japanese Patent 9-250121.

SUMMARY OF THE INVENTION

Some embodiments of the present invention are watering troughs that can be used to provide water to animals, such as birds. The watering troughs can also be used to deliver water to birds as well as other animals, including wildlife or farm animals. Some embodiments of the present insertion include watering devices that comprise, consist essentially of, or consist of a ramp having at least one upwardly inclined ledge extending from a first surface to an inner edge of the ledge, the ledge being configured with the first surface to retain soil, sand, and/or gravel against the effect of gravity when the watering trough is positioned for use on a level surface; the first surface having a first surface portion that has a vertical height of at least one-half inch when the watering trough is positioned for use on a level surface; and the ledge having a lowermost point and an uppermost point and being configured such that, when the watering trough is positioned for use on a level surface, a vertical distance of at least one-quarter inch separates the lowermost and uppermost points. In some embodiments, the first surface has a vertical height of at least one and one-half inches, and a vertical distance of at least one-half inch separates the lowermost and uppermost points. In some embodiments, the watering trough includes one or more additional upwardly inclined ledges, each being configured to retain soil, sand, and/or gravel against the effect of gravity when the watering trough is positioned for use on a level surface, and at least one of the one or more additional ledges extending to an inner edge that borders a surface from which another ledge extends.

The watering troughs of the present invention may have any outer profile when the watering trough is positioned on a level surface for use. For example, the outer profile may be rectangular, square, circular, cylindrical, oval, or pentagonal, to name a few.

When positioned for use on a level surface, some embodiments of the watering troughs of the present invention have a height of at least eight inches. In further embodiments, the height may be at least ten inches, at least fourteen inches, at least twenty inches, at least two feet, at least two and one half feet, at least three feet, or at least four feet. Most embodiments will not have a height greater than five feet.

Some embodiments of the watering troughs of the present invention may be configured such that, when positioned for use on a level surface, the watering trough has a greatest lateral dimension taken along a plane parallel to the level surface of at least thirty inches, at least forty-two inches, at least five feet, at least six feet, or at least seven feet. Most embodiments will not have a greatest lateral dimension larger than ten feet.

The upwardly inclined ledge has a lateral length of at least two feet in some embodiments. In other embodiments, the lateral length of the upwardly inclined ledge is at least three feet. In further embodiments, the lateral length of the upwardly inclined ledge is at least four feet. In still further embodiments, the lateral length of the upwardly inclined ledge is at least five feet. In even further embodiments, the lateral length of the upwardly inclined ledge is at least six feet. Most embodiments will not have a lateral length of the upwardly inclined ledge of larger than ten feet.

In some embodiments, the watering trough further includes a wall with a top portion that includes a top surface, a top portion outer edge, and a top portion inner edge. In one embodiment, the top portion is in contact with the first surface and is downwardly inclined from the top portion outer edge to the top portion inner edge when the watering trough is positioned for use on a level surface.

Some embodiments of the watering troughs of the present invention include a wall with a length of at least two feet. A "length" as used in this context is defined as the lateral dimension of an outer border of a wall of a watering trough taken along a line at the intersection of two planes: one that is perpendicular to a level surface on which the watering trough is positioned and one that is parallel to the level surface. The wall may be curved or straight. For curved walls, those of ordinary skill in the art will understand that the "length," by virtue of this definition, is a straight-line dimension, rather than one that is based on the perimetrical length of the curved wall. In some embodiments the watering trough includes a wall with a length of at least three feet. In further embodiments the watering trough includes a wall with a length of at least four feet. In other embodiments the watering trough includes a wall with a length of at least five feet. In still further embodiments the watering trough includes a wall with a length of at least six feet. Most embodiments will not have wall with a length larger than ten feet.

Some embodiments of the present watering troughs include a wall having at least a portion with a height of at least eight inches. A "height" as used in this context is defined as the vertical dimension of the portion (or the entire wall, when the height is constant) taken along a plane perpendicular to a level surface on which the watering trough is positioned. In other embodiments the watering troughs include a wall with a height of at least ten inches. In further embodiments the watering troughs include a wall with a height of at least fourteen inches. In still further embodiments the watering troughs include a wall with a height of at least two feet. In even further embodiments the watering troughs include a wall with a height of at least three feet.

The watering troughs of the present invention may include a wall having at least a portion that has a thickness of at least one inch. "Thickness" as used in this context is defined as the horizontal dimension of the portion (or the entire wall, when the thickness is constant) taken along a plane parallel to a level surface on which the watering trough is positioned. In other embodiments, the watering troughs include a wall with a thickness of at least two inches. In further embodiments, the watering troughs include a wall with a thickness of at least three inches. Most embodiments will not have a wall with a thickness that is larger than eight inches. Watering troughs of the present invention may include a wall with uniform thickness or variable thickness. The "thickness" of a wall or portion of a wall may be distinct from the thickness of the material the wall is made of (such as a wall that is formed from a thin layer of molded plastic or fiberglass).

In some embodiments the upwardly inclined ledge is configured such that, when the watering trough is positioned for use on a level surface, the angle between the upwardly inclined ledge and the level surface is greater than one degree. In some more particular embodiments, the angle between the upwardly inclined ledge and the level surface is greater than five degrees. In most embodiments, the angle between the upwardly inclined ledge and the level surface is not greater than 45 degrees. When the angle of the ledge itself is constant (such as the seat of a park bench), the "angle" as used in this context is defined as the angle between a plane that is parallel to the surface of the upwardly inclined ledge and a plane that is parallel to the level surface. If the ledge slopes not only up so that it and the surface from which it extends can retain soil and/or gravel against the effect of gravity, but also from side to side (whether intended or because of a manufacturing inconsistency), or is otherwise not level, the "angle" as used in this context is defined as the angle between: (a) a plane that intersects (i) a plane that is parallel to the level surface, where the (a)(i) intersection occurs along a line that is parallel to the level surface and (ii) the surface of the upwardly inclined ledge at the lateral middle of that surface in a line that is perpendicular to the line of (a)(i); and (b) a plane that is parallel to the level surface. In further embodiments, the angle between the upwardly inclined ledge and the level surface is greater than one degree. In further embodiments the angle between the upwardly inclined ledge and levl surface is greater than five degrees. In still further embodiments the angle between the upwardly inclined ledge and the level surface is between one degree and thirty degrees. In even further embodiments the angle between the upwardly inclined ledge and the level surface is between ten degrees and thirty degrees.

The watering troughs of the present invention may have a wall with a top portion that is of any configuration. For example, the top portion may be rounded or it may have a flat surface or it may have an angular surface.

Some embodiments of the present watering troughs further include a wall with an opening in the wall. For example, the opening may be configured to allow for placement of water inside the watering trough from a source of water. The opening may be of any shape. In some embodiments, the opening is round. In some embodiments, the opening has a diameter of between one-half inch and five inches. In some embodiments, the watering trough of the present invention includes a fitting in the opening in the wall for delivery of water into the watering trough. The fitting may be composed of any material. Non-limiting examples of materials include brass, bronze, steel, aluminum, or copper. Non-limiting examples of fittings include a pipe, a faucet, a valve, a nozzle, or a stopper. A float valve (not shown) may be used with the opening into which water/liquid may be introduced to the trough to close a valve coupled to the opening when the liquid level is adequate (such that liquid can no longer flow into opening) and to open the valve when the liquid level drops to or below a certain level, to open the value and allow more liquid to flow into the trough through the opening. Any suitable float valve known to those of ordinary skill in the art may be used.

In some embodiments of the present watering troughs, the ramp is configured such that, when the watering trough is positioned for use on a level surface, the angle between the ramp and the level surface is between ten degrees and forty degrees. The "angle" in this context is defined as the angle between a plane in contact with an inner edge any two ledges and a plane that is parallel to the level surface. In further embodiments, the ramp is configured such that, when the watering trough is positioned for use on a level surface, the angle between the ramp and the level surface is between ten degrees and thirty degrees.

Other embodiments of the present invention concern structures for use in a watering trough that comprise, consist essentially of or consist of a ramp having at least one upwardly inclined ledge extending from a first surface to an inner edge of the ledge, the ledge being configured with the first surface to retain soil, sand, and/or gravel against the effect of gravity when the structure is used with a watering trough that is positioned for use on a level surface; the first surface having a first surface portion that has a vertical height of at least one-half inches when the structure is used with a watering trough that is positioned for use on a level surface; the ledge having a perpendicular run distance of at least two inches; and the ledge having a lowermost point and an uppermost point and being configured such that, when the structure is used with a watering trough that is positioned for use on a level surface, a vertical distance of at least one-quarter inch separates the lowermost and uppermost points. In some embodiments, the first surface has a vertical height of at lest one and one-half inches, and a vertical distance of at least one-half inch separates the lowermost and uppermost points. Some embodiments of the structures of the present invention include one or more additional upwardly inclined ledges, each being configured to retain soil, sand, and/or gravel against the effect of gravity when the structure is used with a watering trough that is positioned for use on a level surface, and at least one of the one or more additional ledges extending to an inner edge that borders a surface from which another ledge extends. The structure is configured and inclined such that when the structure is used with a watering trough, it provides birds access to water with a reduced risk of drowning.

In some embodiments of the structures of the present invention, the ramp has a length of at least two feet. "Length" as used in the context of a ramp is defined as the greatest dimension of the structure taken along a plane that passes through the outermost portions of the ramp. In other embodiments of the structures the ramp has a length of at least three feet. In further embodiments of the structures the ramp has a length of at least four feet. In still further embodiments of the structures the ramp has a length of at least five feet. Even further embodiments of the structures have a ramp has a length of at least six feet. Most embodiments of the structures will not have a ramp that is greater than ten feet in length.

Some of the structures of the present invention include an upwardly inclined ledge that has a lateral length of at least two feet. Other embodiments of the present structures include an upwardly inclined ledge that has a lateral length of at least three feet. Further embodiments of the present structures have an upwardly inclined ledge that has a lateral length of at least four feet. Still further structures of the present invention have an upwardly inclined ledge that has a lateral length of at least five feet. Even further embodiments of the present structures have an upwardly inclined ledge that has a lateral length of at least six feet. Most embodiments will not have a lateral length of the upwardly inclined ledge of larger than ten feet.

In some embodiments of the present invention, the structures have an upwardly inclined ledge that is configured such that, when the structure is used with a watering trough that is positioned for use on a level surface, the angle between a plane passing through the inner edge of the ledge and the uppermost point of the ledge and a plane parallel to the level surface is greater than one degree. In other embodiments of the present structures, the angle between a plane passing through the inner edge of the ledge and the uppermost point of the ledge and a plane parallel to the level surface is greater than five degrees. In other embodiments of the present structures, the angle between a plane passing through the inner edge of the ledge and the uppermost point of the ledge and a plane parallel to the level surface is greater than ten degrees. In still further embodiments of the present structures, the angle between a plane passing through the inner edge of the ledge and the uppermost point of the ledge and a plane parallel to the level surface is between ten degrees and forty degrees with the level surface.

Some embodiments of the watering troughs and structures of the present invention include one or more additional upwardly inclined ledges, each ledge may have a lateral length of at least two feet. Further embodiments of the troughs or structures that include one or more additional upwardly inclined ledges, each ledge has a lateral length that is at least three feet. Still further embodiments of the troughs or structures that include one or more additional upwardly inclined ledges, each ledge has a lateral length that is at least four feet. Even further embodiments of the troughs or structures that include one or more additional upwardly inclined ledges, each ledge has a lateral length that is at least five feet. Other embodiments of the troughs or structures that include one or more additional upwardly inclined ledges, each ledge has a lateral length that is at least six feet. Most embodiments will not have a lateral length of the upwardly inclined ledge of larger than ten feet.

Some watering troughs and structures of the present invention comprise, consist essentially of, or consist of a ramp having at least one ledge extending from a first surface to an inner edge of the ledge, the ledge being configured with the first surface to retain soil, sand, and/or gravel against the effect of gravity when the watering trough is positioned for use on a level surface or the structure is positioned for use in a watering trough positioned on a level surface; the first surface having a first surface portion that has a vertical height of at least one-half inch when the watering trough or structure is positioned for use, where the ledge is substantially parallel to the level surface. Some embodiments include more than one ledge that is substantially parallel to the level surface, and may optionally include one or more upwardly inclined ledges. Each ledge may have a lateral length of at least three feet, at least four feet, at least five feet, or at least six feet. Most embodiments will not have a lateral length of the ledge that is larger than ten feet. One or more upwardly inclined ledges together with one or more ledges that are substantially parallel to the level surface are present in some embodiments.

The watering troughs and structures of the present invention may include any number of upwardly inclined ledges or ledges that are substantially parallel to the level surface. In some embodiments, the watering troughs and structures include at least three ledges. In further embodiments the watering troughs and structures include at least five ledges. In still further embodiments the watering troughs and structures include at least eight ledges. Some embodiments will not have greater than 20 ledges. Other embodiments will not have greater than 50 ledges. Further embodiments will not have greater than 100 ledges.

The watering troughs and structures of the present invention may be made of any material known to those of ordinary skill in the art. Non-limiting examples of materials include concrete, fiberglass, polyurethane, polyethylene, rubber, polyvinyl, polypropylene, wood, rigid plastic, metal, ceramic, graphite, stone, or glass.

Some embodiments of the watering troughs and structures of the present invention are made of pre-cast concrete. The watering troughs of the present invention may be rigid or may be flexible.

Embodiments that comprise concrete can comprise concrete reinforced with structural material, such as material commonly known in the art as reinforcing bar, or rebar. The rebar can be arranged in any suitable pattern and comprise steel bars of uniform or varied size. For example, the pattern may comprise ⅜ inch deformed steel rods or bars centered in walls that delineate the exterior of the watering trough, two ⅜ inch deformed steel rods or bars in the top portion of the watering trough, and two ⅜ inch deformed steel rods or bars in a bottom portion of the watering trough. Rods or bars that are perpendicular to other rods or bars may optionally be used to keep the rebar properly arranged in a suitable pattern.

Some embodiments that comprise concrete can comprise concrete reinforced with a structural material that comprises fibers. For example, the fiber may be comprised of fiberglass or a fiberglass analogue that is mixed in with the concrete to significantly improve the strength of the watering trough or structure.

The concrete itself can comprise a mixture that yields concrete having a suitable compressive strength for the application. Some embodiments will have concrete with a compressive strength of at least 3000 pounds per square inch (psi). Other embodiments may yield concrete with a stronger or weaker compressive strength, depending on the application for the structure and/or trough. For example, some embodiments may have a compressive strength of 5000 psi, and may comprise, among other constituents, sand, gravel, and cement. The aggregates in the mixture may range from fine to coarse. Any suitable form release material may be sprayed on or otherwise applied to a form used to create one of these embodiments. After being released from the form, the structure or trough may cure naturally indoors for 2 to 3 days, or in any other suitable manner known to those of ordinary skill in the art.

Some embodiments of the watering troughs and structures include a surface that includes a coating. Non-limiting examples of coatings include fiberglass, polyurethane, polyethylene, rubber, polyvinyl, polypropylene, wood, rigid plastic, metal, ceramic, graphite, stone, or glass. In some embodiments, a surface of the watering trough or structure is coated with a layer of paint or other composition to provide for resistance of the watering trough or structure to weathering and sun exposure.

Other embodiments of the present invention concern methods of delivering water to an animal that comprise, consist essentially of, or consist of placing a watering trough of the present invention in an area where an animal is located, where the trough includes water. The animal may be any animal. The animal may be a wild animal, a farm animal, or a domestic animal. In some embodiments the methods concern methods of delivering water to wildlife. The animal may be any animal, such as a bird, an elk, a deer, a rabbit, a squirrel, a coyote, or a mouse. In some embodiments, the animal is a bird. In still further embodiments, the method is a method of delivering water to more than one type of animal. For example, the method is a method of delivering water to a bird and a larger animal. Non-limiting examples of other animals include a deer, an elk, a sheep, a goat, or a rabbit.

In some embodiments of the present methods, at least a portion of a surface of the watering trough is contacted with soil. The methods of the present invention may optionally further include excavating an area of soil to create an excavated area, and placing the watering trough in the excavated area.

In other embodiments of the present methods, the method further includes delivering water to the watering trough. Delivering water to the watering trough may be by any method known to those of ordinary skill in the art. For example, water may be delivered through an opening in one of the watering troughs of the present invention. The watering trough may be fabricated with the opening, or the watering trough may be fabricated without the opening with the opening subsequently formed in the watering trough using any method known to those of ordinary skill in the art such as by drilling. In some embodiments a hose for delivery of water is attached to the watering trough.

Some embodiments of the present methods further including placing water in the watering trough. Water can be placed in the watering trough using any method known to those of ordinary skill in the art. A hose, pipe, or other connection may optionally be used to delivery water into the watering trough. The source of water may be any source, such as a natural source or an artificial source. In some embodiments, the source of water is water located in a storage tank that is located near the watering trough of the present invention. The watering trough may be connected to the storage tank using any method known to those of ordinary skill in the art, such as by a pipe or hose. There may be an interposed valve, faucet, or spigot between the connection between the storage tank and the watering trough.

Some embodiments of the present methods of delivering water to an animal further comprise covering at least a portion of the watering trough. Covering the watering trough may help reduce evaporation and aid in reducing the accumulation of debris in the watering trough. The covering may be any cover known to those of ordinary skill in the art, such as a tarp or a roof.

Some embodiments of the present methods of delivering water further include placing soil, sand, and/or gravel in contact with an upwardly inclined ledge of the watering trough.

Other embodiments of the present invention concern methods of retrofitting a watering trough to deliver water, soil, sand and/or gravel to birds that comprise, consist essentially of, or consist of positioning a structure for use in a watering trough of the present invention in a watering trough. In some embodiments the method further includes placing water in the watering trough. In some embodiments the method further includes placing soil, sand, and/or gravel in contact with an upwardly inclined ledge of the structure.

In some embodiments, the method of retrofitting a watering trough to deliver water, soil, sand and/or gravel to birds is further defined as a method to deliver water to wildlife, including birds as well as larger animals.

Any embodiment of any of the present watering devices, structures, and methods may consist of or consist essentially of—rather than comprise/include/contain/have—the described features and/or steps. Thus, in any of the claims, the term "consisting of" or "consisting essentially of" may be substituted for any of the open-ended linking verbs recited above, in order to change the scope of a given claim from what it would otherwise be using the open-ended linking verb.

Details associated with these embodiments and others are provided below.

BRIEF DESCRIPTION OF THE DRAWINGS

The following drawings illustrate by way of example and not limitation. Identical reference numbers do not necessarily indicate an identical structure. Rather, the same reference number may be used to indicate a similar feature or a feature with similar functionality, as may non-identical reference numbers. Every feature of each embodiment is not always labeled in every figure in which that embodiment appears, in order to keep the figures clear. The figures are drawn to scale, meaning the sizes of the depicted elements are accurate relative to each other for at least the set of embodiments depicted in the figures.

DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a watering trough, a structure or a method that "comprises," "has," "contains," or "includes" one or more recited elements or steps possesses those recited elements or steps, but is not limited to possessing only those elements or steps; it may possess elements or steps that are not recited. Likewise, an element of a watering trough, structure or method that "comprises," "has," "contains," or "includes" one or more recited features possesses those features, but is not limited to possessing only those features; it may possess features that are not recited. Furthermore, a watering trough or structure that is configured in a certain way must be configured in at least that way, but also may be configured in a way or ways that are not specified.

The terms "a" and "an" are defined as one or more than one unless this disclosure explicitly requires otherwise. The terms "substantially" is defined as at least close to (and includes) a given value or state (preferably within 10% of, more preferably within 1% of, and most preferably within 0.1% of). The term "coupled" is defined as connected, although not necessarily directly, and not necessarily mechanically; two items that are "coupled" may be integral with each other.

The present watering troughs may be used to deliver water to animals, such as to birds and other wildlife. A user (or someone helping a user) may place a watering trough of the present invention in an area where an animal is located. The structures of the present invention may be used to retrofit an existing watering trough to safely deliver water, soil, sand and/or gravel to a bird. A user (or someone helping a user) can position a structure of the present invention in a watering trough, and place water in the watering trough. Soil, sand and/or gravel may be contacted with an upwardly inclined ledge of the structure for delivery of soil, sand and/or gravel to a bird in addition to water. Some embodiments of the present watering troughs may be configured to be ecologically sound, and/or may provide for safe delivery of water to birds with a reduced risk of drowning.

Watering Troughs

Figure 1:
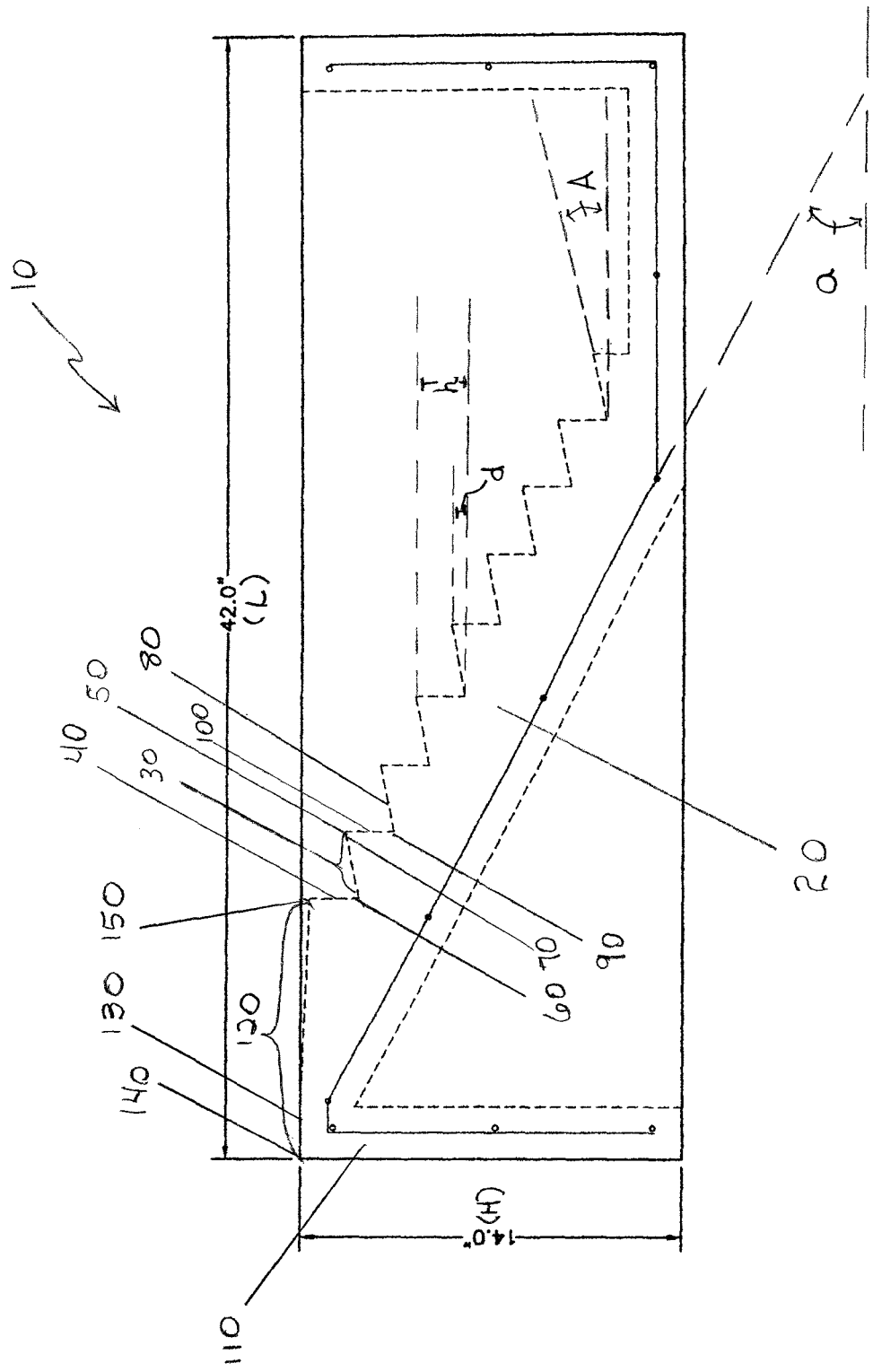
FIG. 1 is a side view of one embodiment of the present watering troughs.
Figure 2:
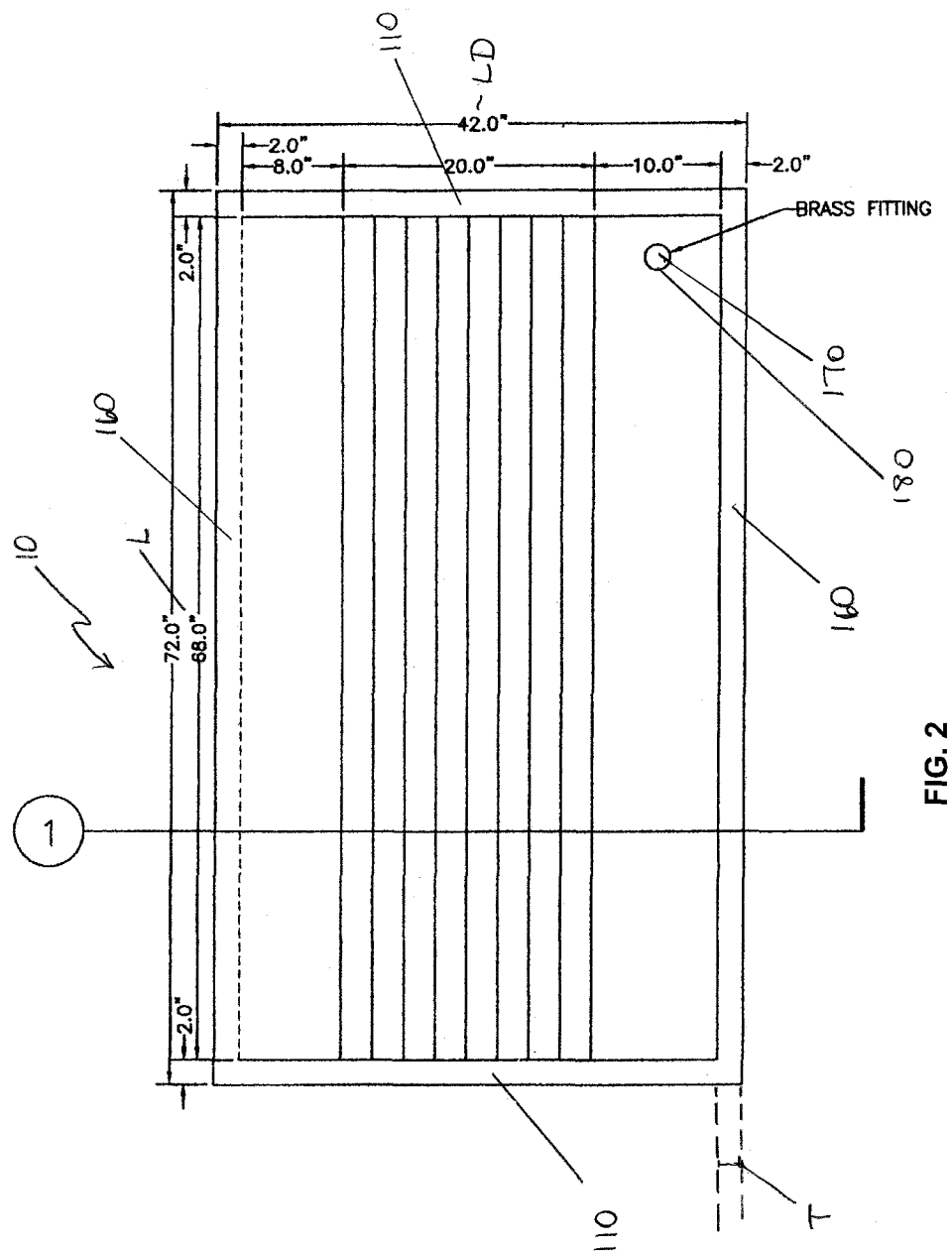
FIG. 2 is a top view of the embodiment shown in FIG. 1
Figure 3:
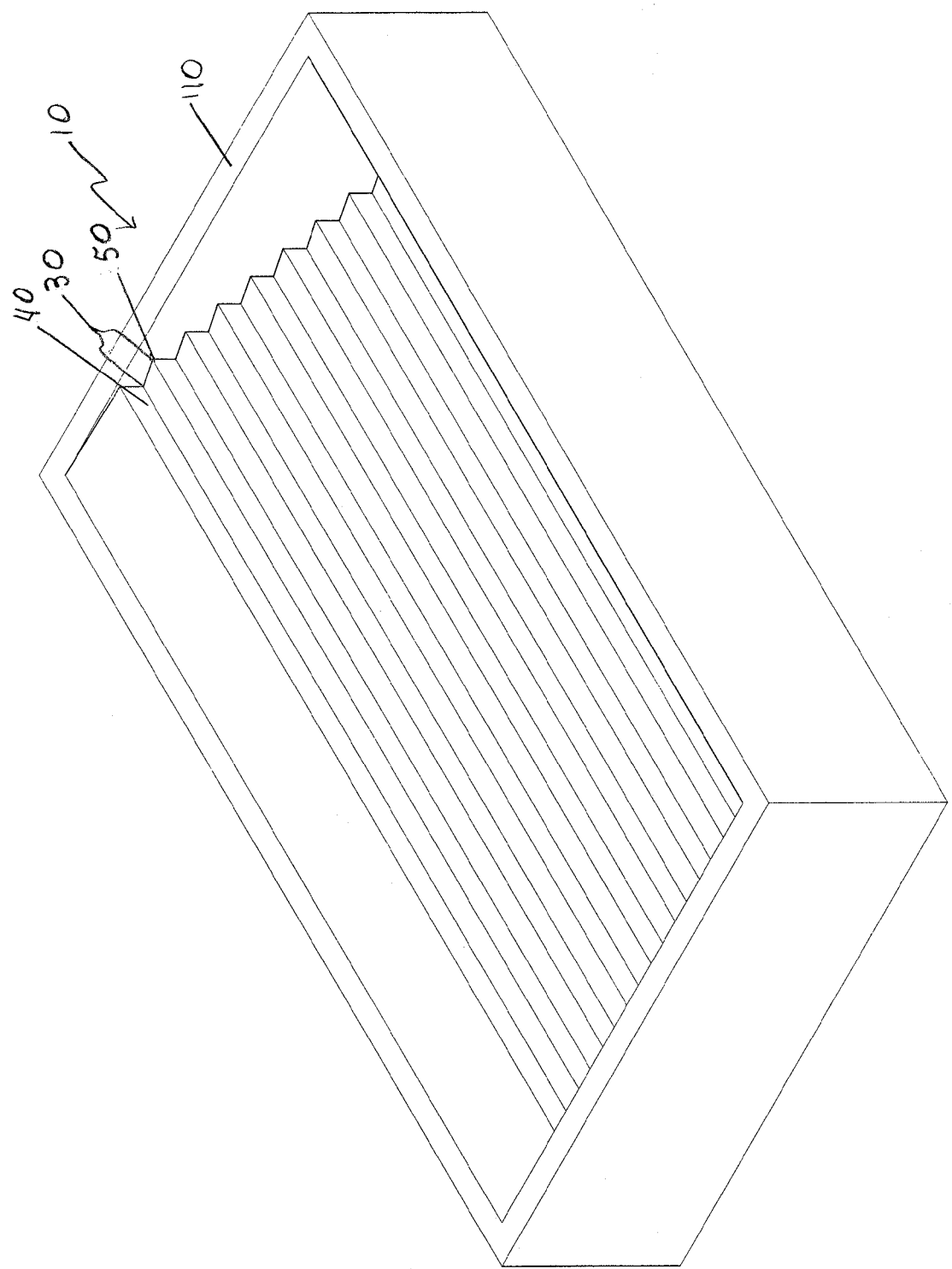
FIG. 3 is a perspective view of the embodiment shown in FIG. 1 and FIG. 2.

FIG. 1, FIG. 2, and FIG. 3 represent one embodiment of the present watering troughs. Watering trough 10 comprises ramp 20 having upwardly inclined ledge 30 extending from first surface 40 to inner edge 50 of ledge 30, ledge 30 being configured with first surface 40 to retain soil, sand, and/or gravel against the effect of gravity when watering trough 10 is positioned for use on a level surface. First surface 40 has a first surface portion that has a vertical height h of 1.3 inches when the watering trough is positioned for use on a level surface. This is depicted in FIG. 1, where trough 10 includes multiple ledges with the same vertical height of 1.3 inches. Ledge 30 has a perpendicular run distance of two and one-half inches. Ledge 30 has lowermost point 60 and uppermost point 70 as is configured such that, when watering trough is positioned for use on a level surface, a vertical distance d of 1.8 inches separates lowermost point 60 and uppermost point 70. This is depicted in FIG. 1, where trough 10 includes multiple ledges with the same vertical distance of 1.8 inches that separate lowermost point and uppermost point of each ledge. In the depicted watering trough, ramp 20 includes seven additional upwardly inclined ledges, each ledge being configured to retain soil, sand, and/or gravel against the effect of gravity when the watering trough is positioned for use on a level surface. Ledge 80 extends to inner edge 90 that borders surface 100 from which ledge 80 extends.

As shown in FIG. 2 and FIG. 3, watering trough 10 has an outer rectangular profile. The depicted watering has two walls 110 with a length of forty-two inches, and two walls 160 having a length of 72 inches. In some embodiments, the watering trough includes a wall with a length of at least two feet. In other embodiments, the watering trough of the present invention includes a wall with a length of at least three feet. Further embodiments include a wall with a length of at least four feet. Still further embodiments include a wall with a length of at least five feet. Even further embodiments include a wall with a length of at least six feet.

Each wall of the depicted watering trough has a height H of 14.0 inches and a thickness T of two inches. Thus, each wall has at least portion with such a height and a portion with such a thickness. In some embodiments, the watering trough has a wall with a portion that has a height of at least twelve inches.

The depicted watering trough as shown in FIG. 2 is configured such that, when positioned for use on a level surface, it has lateral dimension LD taken in the direction that ramp 20 runs along a plane parallel to the level surface of forty-two inches. The depicted watering trough is also configured such that, when positioned for use on a level surface, it has a greatest lateral dimension equal to the distance between opposing corners (i.e., front left to back right) taken along a plane that is parallel to the level surface.

Watering trough 10 has eight upwardly inclined ledges 30 that have a lateral length of 68 inches.

Watering trough 10 further comprises wall 110 with top portion 120 that includes top surface 130, top portion outer edge 140, and top portion inner edge 150. The top surface 130 is downwardly inclined from top portion outer edge 140 to top portion inner edge 150 in the depicted embodiment. Further, in the depicted embodiments top portion outer edge 140 is in contact with first surface 40.

In the depicted embodiment, upwardly inclined ledge 30 is configured such that, when the watering trough is positioned as shown for use on a level surface, the angle A between the upwardly inclined ledge and a plane parallel to the level surface is at least five degrees. This is depicted in FIG. 1.

Watering trough 10 includes opening 170 having a diameter of two inches. In the depicted embodiment, brass fitting 180 is positioned in opening 170. Watering trough 10 is configured such that a source of water may be connected to brass fitting 180 to provide for placement of water in the watering trough.

Watering trough 10 includes ramp 20 that is configured such that when watering trough is positioned for use on a level surface, the angle a between the ramp and a plane parallel to the level surface is between ten degrees and thirty degrees. This is depicted in FIG. 1.

Figure 4:
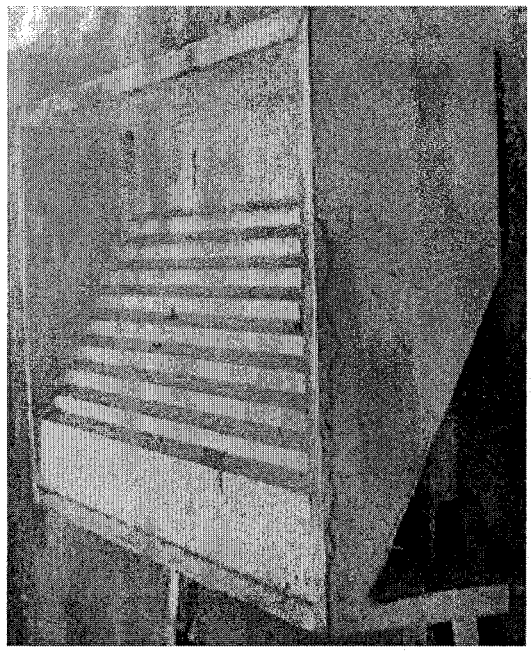
FIG. 4 is a perspective view of an actual example of the embodiment shown in FIG. 1, FIG. 2, and FIG. 3.

FIG. 4 depicts a perspective view of an actual example of an embodiment of a watering trough of the present invention.

Structures for Use in a Watering Trough

Figure 5:
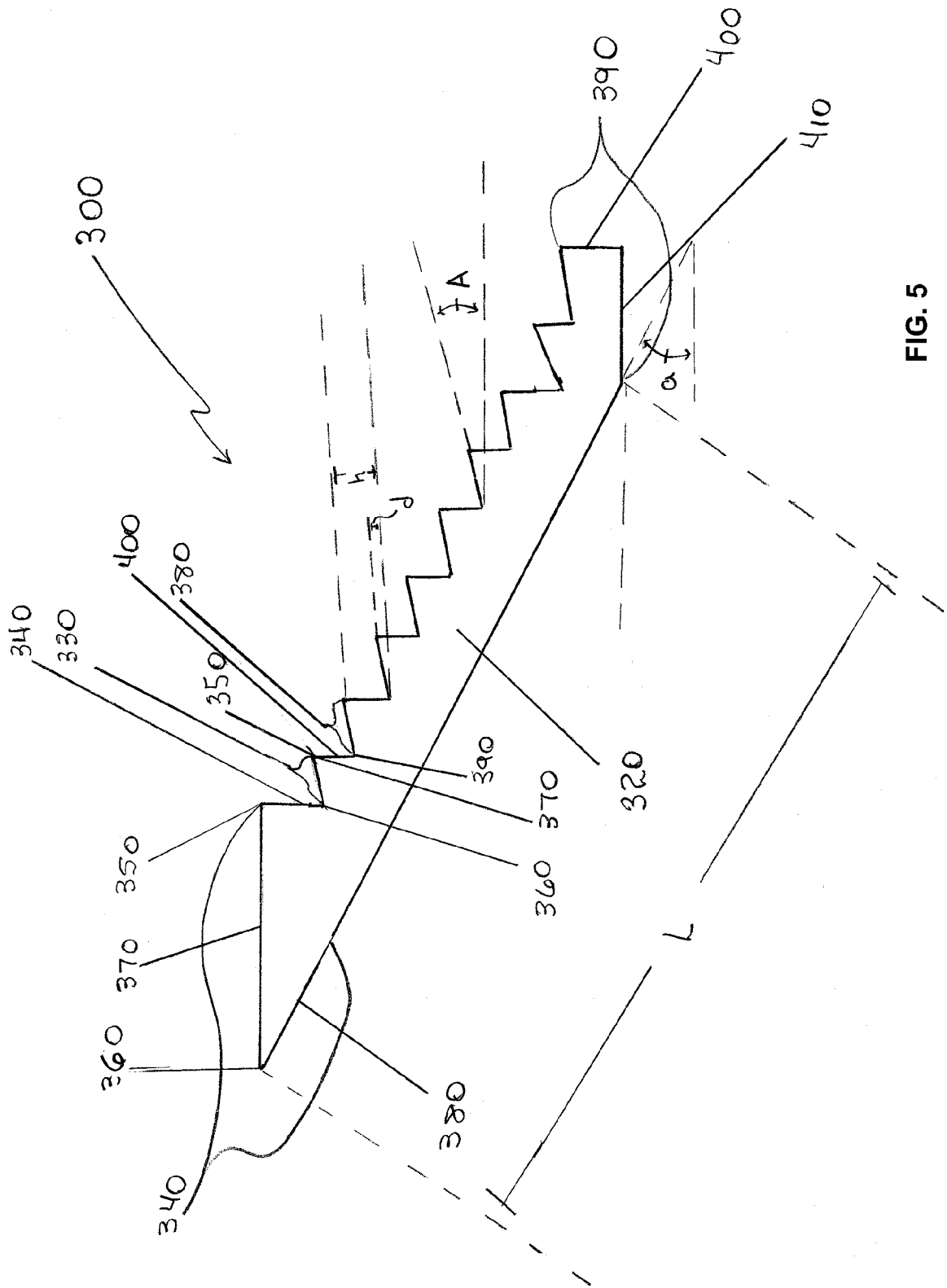
FIG. 5 is a side view of one embodiment of the present structures.
Figure 6:
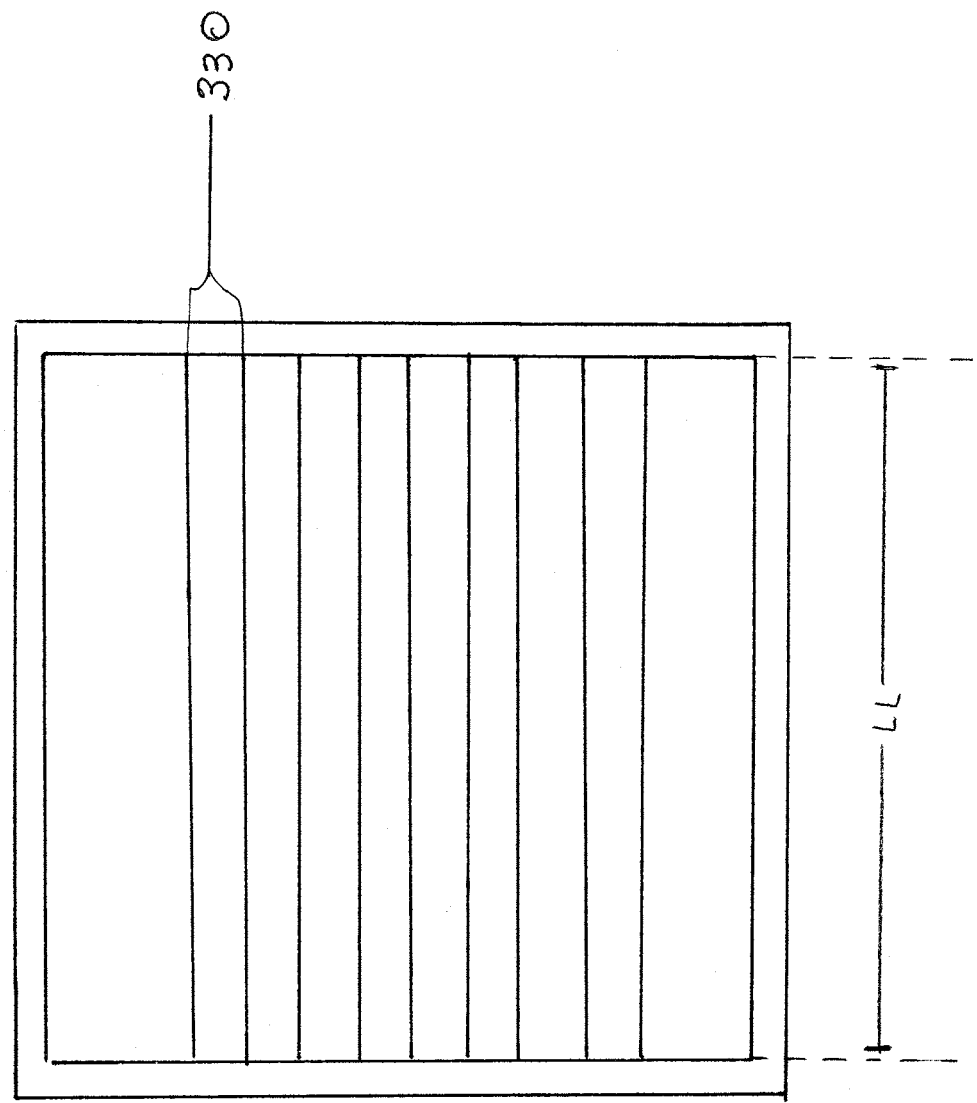
FIG. 6 is a top view of the embodiment shown in FIG. 5.

FIG. 5 shows a side view of one example of an embodiment of the present structures for use in a watering trough, and FIG. 6 shows a top view of the structure depicted in FIG. 5.

As depicted in FIG. 5, structure 300 comprises ramp 320 having an upwardly inclined ledge 330 extending from a first surface 340 to inner edge of the ledge 350, ledge 330 being configured with first surface 340 to retain soil, sand, and/or gravel against the effect of gravity when structure 300 is used with a watering trough that is positioned for use on a level surface. First surface 340 has first surface portion that has a vertical height h of 1.3 inches when the structure is positioned for use on a level surface. Ledge 330 has a perpendicular run distance of two and one-half inches. Ledge 330 has lowermost point 360 and uppermost point 370 and is configured such that, when the structure is used in a watering trough positioned for use on a level surface, a vertical distance d of 1.8 inches separates lowermost point 360 and uppermost point 370. In FIG. 5, h and d as shown are the same as for ledge 330. In the depicted structure, the ramp 320 includes a plurality of upwardly inclined ledges, each being configured to retain soil, sand, and/or gravel against the effect of gravity when the watering trough is positioned for use on a level surface. Ledge 380 extends to an inner edge 390 that borders surface 400 from which ledge 380 extends.

As shown in FIG. 6, structure 300 has nine upwardly inclined ledges that have a lateral length LL of 68 inches.

In structure 300, upwardly inclined ledge 330 is configured such that, when the structure is used with a watering trough that is positioned for use on a level surface, the angle A between the upwardly inclined ledge and a plane that is parallel to the level surface is greater than five degrees. In FIG. 5, A that is depicted is the same as for ledge 330.

Ramp 320 of structure 300 has a length L of about thirty-two inches in its longest dimension along a plane that is perpendicular to the ledges. Ramp 320 is configured such that, when structure 330 is used with a watering trough that is positioned for use on a level surface, ramp 320 forms an angle a of between about ten degrees and forty degrees with the level surface.

Structure 300 includes top portion 340 having top portion inner edge 350, top portion outer edge 360, top portion upper surface 370, and top portion lower surface 380. When structure 300 is used with a watering trough that is positioned for use on a level surface, top portion inner edge 350 or top portion lower surface 380 may be in contact with the watering trough. Structure 300 may be provided with a portion that is configured to fits over a wall or other portion of a watering trough, such as in the way the edge of a lid fits over the lip of a container. Thus, the top portion of the structure may be configured with a curved portion that fits over (or hooks over, or clamps to) the wall of a watering trough.

Structure 330 includes bottom portion 390 that includes bottom portion lateral surface 400 and bottom portion lower surface 410. When structure 330 is used with a watering trough that is positioned for use on a level surface, bottom portion lateral surface 400 and/or bottom portion lower surface 410 may be in contact with the watering trough or a securing structure positioned in or otherwise attached to the watering trough.

Structure 330 is maintained is a stable position in a watering trough by stabilization of bottom portion 390, such as by positioning bottom portion lateral surface 400 against a wall of the watering trough and/or bottom portion lower surface 410 against the floor of the watering trough. Alternatively, for example, structure 330 may be maintained in position by contacting a brick or other heavy object positioned in the bottom of the watering trough with portion 390 of structure 330.

Figure 7:
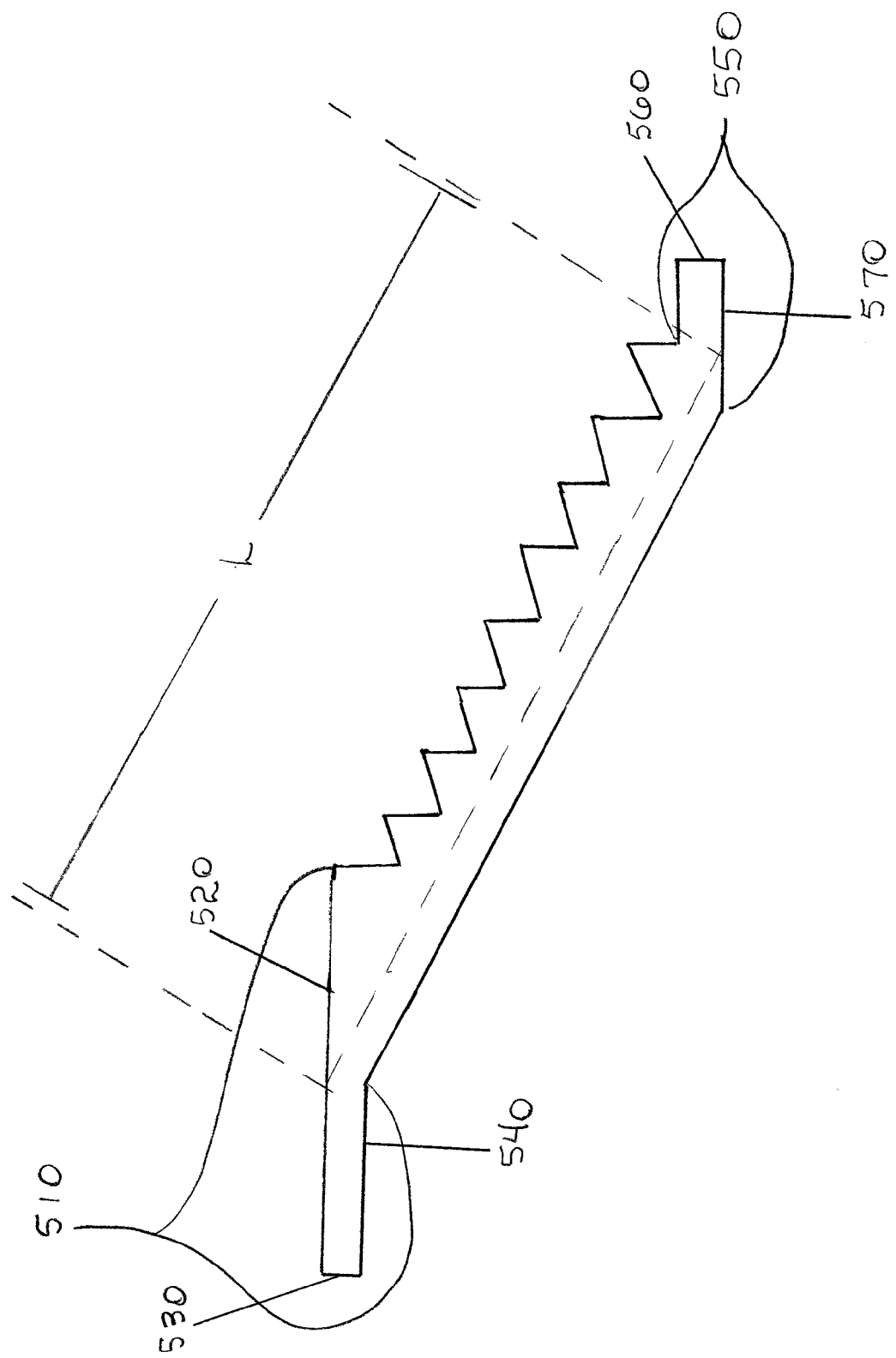
FIG. 7 is a side view of one embodiment of the present structures.

In the embodiment of the structure shown in FIG. 7, structure 500 includes top portion 510 that includes top portion top surface 520, top portion outer surface 530, and top portion lower surface 540. Structure 500 also includes bottom portion 550 with bottom portion lateral surface 560 and bottom portion lower surface 570. Structure 500 is maintained in a stable position at least in part by contacting positioning structure 500 such that top portion lower surface 540 is in contact with a wall of the watering trough and bottom portion lower surface 570 is in contact with a floor of the watering trough. In some embodiments, top surface lower portion is curved and overhangs a wall of a watering trough. In some other embodiments, the top surface is configured to provide for placement of a clamp between the structure and the watering device.

Figure 8:
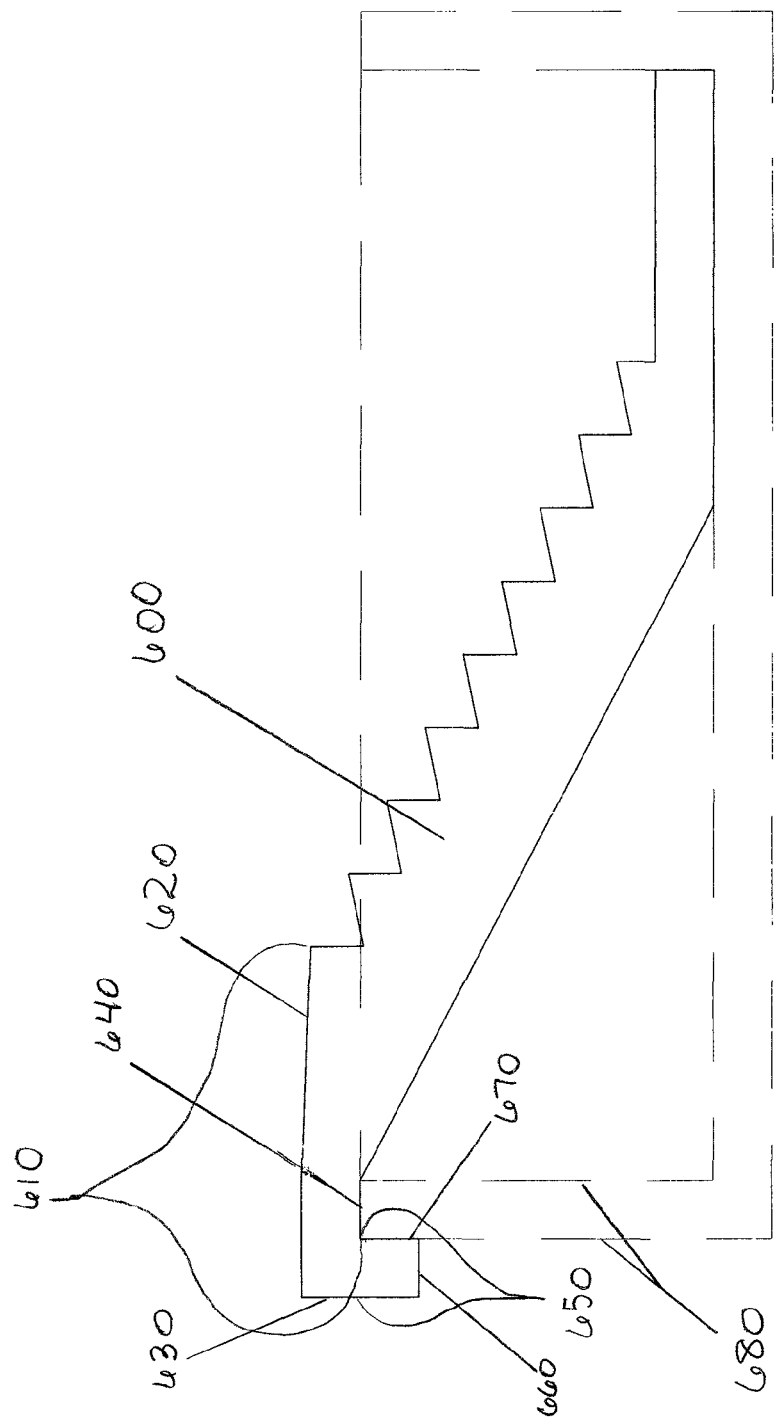
FIG. 8 is a side view of one embodiment of the present structures, with phantom image of a watering trough is depicted by dashed lines.
Figure 9:
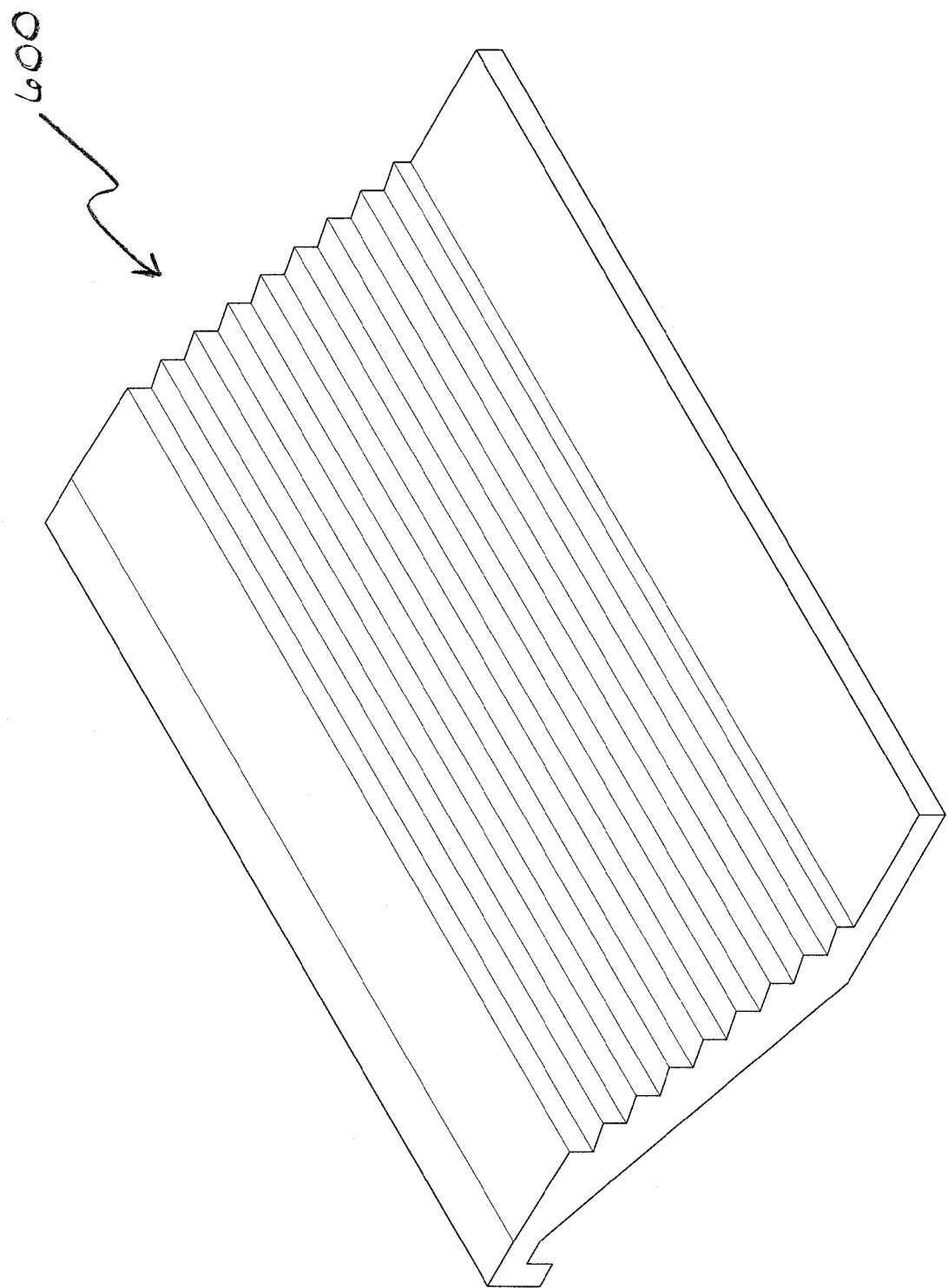
FIG. 9 is a perspective view of the embodiment shown in FIG. 8.

A further embodiments of a structure of the present invention is shown in FIG. 8. In this embodiment, structure 600 includes top portion 610 that includes top portion top surface 620, top portion outer surface 630, and top portion lower surface 640. Top portion outer surface 630 extends downward to form overhang portion 650. Overhang portion 650 further includes overhang portion bottom surface 660 and overhang portion inner surface 670. FIG. 8 depicts structure 600 in position in a phantom image of a watering trough 680 depicted by dashed lines. To portion 610 and overhang portion 650 function to stabilize position of structure 600 for use in a watering trough as depicted in FIG. 8. Top portion lower surface 640 and overhang portion inner surface 670 are in contact with the watering trough depicted in FIG. 8. A perspective view of structure 600 is shown in FIG. 9.

The present watering troughs and structures can be individually packaged for sale. The package may contain one watering trough or structure (or more that one watering trough or structure) and a set of instructions for use. Thus, some embodiments of the present invention include, consist of, or consist essentially of one of the present insertion devices, a set of instructions for use, and a package (such as a box, crate, sealed tarp, and the like). The package may include the instructions for use on the outside of the package or on material (e.g., a folded piece of paper) placed in the package. The structure for use in a watering trough may be placed in a package alone or with a watering trough.

The watering troughs and structures for retrofitting a watering trough of the present invention may be made from any of a variety of suitable materials that are well-known to those of ordinary skill in the art. Examples of such materials have been previously set forth. The present watering troughs and structures for retrofitting a watering trough are not intended to be limited to the particular forms disclosed. Rather, they include all modifications, equivalents, and alternatives falling within the scope of the claims. For example, while the elements of the embodiment of watering trough 10 shown in the figures include eight ledges, other embodiments may include fewer ledges or a greater number of ledges. For example, the lateral length of ledges of the structures of the present watering troughs and structures may be of variable length. As another example, other embodiments of the present structures that may be used to retrofit an existing watering trough may be configured to be centered in the middle (or near the middle) of a watering trough, with one or more ramps (having one or more ledges, as identified above) that extend from the middle or near middle and toward an outer wall or section of the watering trough. With such embodiments, one ramp could be used, two ramps could be positioned back to back, or any number of ramps could be arranged like spokes extending from the center of a wheel.

The claims are not to be interpreted as including means-plus- or step-plus-function limitations, unless such a limitation is explicitly recited in a given claim using the phrase(s) "means for" or "step for," respectively.

The invention claimed is:

1. A watering trough comprising:
   a ramp having at least one upwardly inclined ledge extending from a first surface to an inner edge of the ledge, the ledge being configured with the first surface to retain soil, sand, and/or gravel against the effect of gravity when the watering trough is positioned for use on a level surface;
   the first surface having a first surface portion that has a vertical height of at least one-half inch when the watering trough is positioned for use on a level surface;
   the ledge having a perpendicular run distance of at least two inches; and
   the ledge having a lowermost point and an uppermost point and being configured such that, when the watering trough is positioned for use on a level surface, a vertical distance of at least one-quarter inch separates the lowermost and uppermost points.

2. The watering trough of claim 1, where the watering trough includes one or more additional upwardly inclined ledges, each being configured to retain soil, sand, and/or gravel against the effect of gravity when the watering trough is positioned for use on a level surface, and at least one of the one or more additional ledges extending to an inner edge that borders a surface from which another ledge extends.

3. The watering trough of claim 2, where the watering trough has an outer rectangular profile.

4. The watering trough of claim 2, where the watering trough of has an outer cylindrical profile.

5. The watering trough of claim 2, where each upwardly inclined ledge has a lateral length of at least two feet.

6. The watering trough of claim 1, where the watering trough is made of pre-cast concrete.

7. The watering trough of claim 1, where the watering trough is made of fiberglass, polyurethane, polyethylene, rubber, polyvinyl, polypropylene, wood, rigid plastic, metal, ceramic, graphite, stone, or glass.

8. The watering trough of claim 1, where the upwardly inclined ledge has a lateral length of at least two feet.

9. The watering trough of claim 1, where the watering trough further comprises a wall with a top portion that includes a top surface, a top portion outer edge, and a top portion inner edge.

10. The watering trough of claim 9, where the top portion is in contact with the first surface and is downwardly inclined from the top portion outer edge to the top portion inner edge.

11. The watering trough of claim 1, where the watering trough further comprises a wall with a length of at least two feet.

12. The watering trough of claim of claim 1, where the watering trough further comprises a wall with a thickness of at least one inch.

13. The watering trough of claim 1, where the ramp is configured such that, when the watering trough is positioned for use on a level surface, the angle between the ramp and the level surface is between ten degrees and forty degrees.

14. The watering trough of claim 13, where the ramp is configured such that, when the watering trough is positioned for use on a level surface, the angle between the ramp and the level surface is between ten degrees and thirty degrees.

15. A method of delivering water to an animal, comprising placing a watering trough as set forth in claim 1 in an area where an animal is located, where the trough includes water.

16. The method of claim 15, where at least a portion of a surface of the watering trough is contacted with soil.

17. A structure for use in a watering trough comprising:
an ramp having at least one upwardly inclined ledge extending from a first surface to an inner edge of the ledge, the ledge being configured with the first surface to retain soil, sand, and/or gravel against the effect of gravity when the structure is used with a watering trough that is positioned for use on a level surface;
the first surface having a first surface portion that has a vertical height of at least one-half inch when the structure is used with a watering trough that is positioned for use on a level surface;
the ledge having a perpendicular run distance of at least two inches; and
the ledge having a lowermost point and an uppermost point and being configured such that, when the structure is used with a watering trough that is positioned for use on a level surface, a vertical distance of at least one-quarter inch separates the lowermost and uppermost points.

18. The structure of claim 17, where the structure includes one or more additional upwardly inclined ledges, each being configured to retain soil, sand, and/or gravel against the effect of gravity when the structure is used with a watering trough that is positioned for use on a level surface, and at least one of the one or more additional ledges extending to an inner edge that borders a surface from which another ledge extends.

19. The structure of claim 18, where each upwardly inclined ledge has a lateral length of at least two feet.

20. The structure of claim 17, where the structure is made of pre-cast concrete.

21. The structure of claim 17, where the structure is made of fiberglass, polyurethane, polyethylene, rubber, polyvinyl, polypropylene, wood, rigid plastic, metal, ceramic, graphite, stone, and glass.

22. The structure of claim 17, where the ramp has a length of at least two feet.

23. The structure of claim 17, where the upwardly inclined ledge is configured such that, when the structure is used with a watering trough that is positioned for use on a level surface, the angle between the upwardly inclined ledge and the level surface is greater than five degrees.

24. The structure of claim 23, where the upwardly inclined ledge is configured such that, when the structure is used with a watering trough that is positioned for use on a level surface, the angle between the upwardly inclined ledge and the level surface is greater than ten degrees.

25. The structure of claim 17, further comprising a coating on the first surface or the upwardly inclined ledge.

\* \* \* \* \*